United States Patent
Bryant

(10) Patent No.: US 9,882,856 B2
(45) Date of Patent: Jan. 30, 2018

(54) METHOD AND DEVICE FOR PRIORITIZING MESSAGES BASED ON ORIGINATING TIME ZONE

(71) Applicant: BlackBerry Limited, Waterloo (CA)

(72) Inventor: Cody Bryant, Waterloo (CA)

(73) Assignee: BlackBerry Limited, Waterloo (CA)

( * ) Notice: Subject to any disclaimer, the term of this patent is extended or adjusted under 35 U.S.C. 154(b) by 253 days.

(21) Appl. No.: 14/796,084

(22) Filed: Jul. 10, 2015

(65) Prior Publication Data

US 2017/0012919 A1  Jan. 12, 2017

(51) Int. Cl.
*H04L 12/58* (2006.01)

(52) U.S. Cl.
CPC .............. *H04L 51/24* (2013.01); *H04L 51/20* (2013.01); *H04L 51/22* (2013.01); *H04L 51/26* (2013.01)

(58) Field of Classification Search
CPC ......... H04L 51/24; H04L 51/26; H04L 51/20; H04L 51/22
See application file for complete search history.

(56) References Cited

U.S. PATENT DOCUMENTS

| | | | | |
|---|---|---|---|---|
| 8,296,376 | B2 * | 10/2012 | Goldberg | H04L 51/34 709/206 |
| 8,364,765 | B2 | 1/2013 | Champlin-Scharff et al. | |
| 2010/0121925 | A1 * | 5/2010 | Champlin-Scharff | G06Q 10/107 709/206 |
| 2014/0324999 | A1 * | 10/2014 | Dan | H04L 51/22 709/206 |

FOREIGN PATENT DOCUMENTS

EP    2040206 A1    3/2009

OTHER PUBLICATIONS

"Time Zones in e-Discovery"—Arman Gungor, Meridian Discovery, LLC, Apr. 2012 https://www.meridiandiscovery.com/articles/time-zones-in-e-discovery/.*
Extended European Search Report dated Dec. 1, 2016 from EP 16169197.7, 7 pgs.

* cited by examiner

*Primary Examiner* — Randy Scott
(74) *Attorney, Agent, or Firm* — Jenna L. Wilson; Wilson Lue LLP

(57) ABSTRACT

A method, non-transitory computer readable medium and a communication device display an email message by receiving at least one incoming email message, determining the incoming email message originates from a different time zone than the time zone in which the communication device is currently located, and displaying the incoming email message in a prioritized position within a message listing. The incoming email may be displayed at a top of the message list, regardless of reception order. When a plurality of incoming email messages that originate from different time zones are received, each incoming email message is displayed in the message listing according to an absolute or relative time distance from the communication device. When the incoming email message has been read, the read email message is moved to a normal position within the message list.

18 Claims, 6 Drawing Sheets

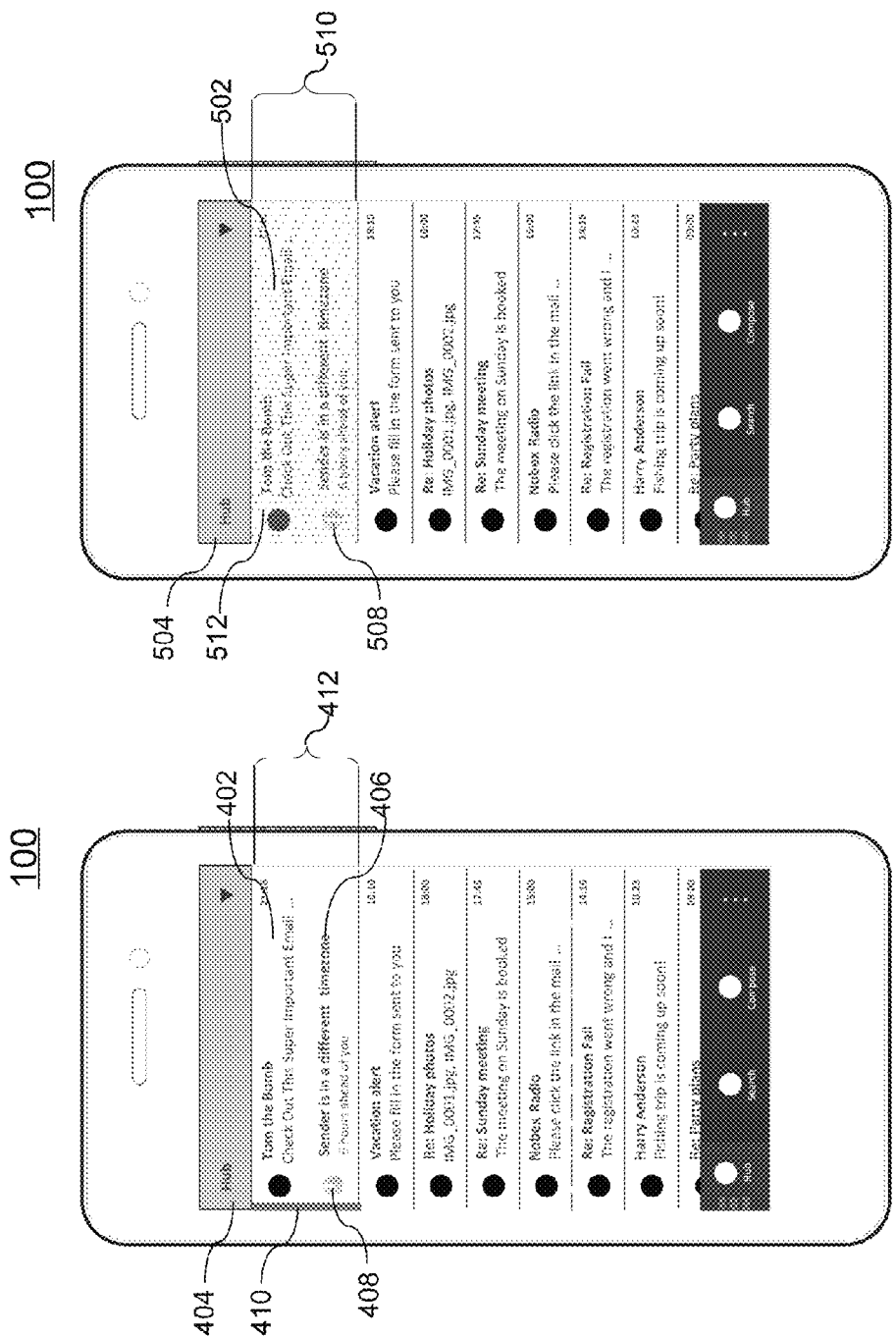

METHOD AND DEVICE FOR PRIORITIZING MESSAGES BASED ON ORIGINATING TIME ZONE

BACKGROUND OF THE INVENTION

Field of the Invention

The present invention relates to email messaging and more particularly to a method and communication device for prioritizing email messages based upon the time zone of the originating message.

Description of the Related Art

When communicating via email, particularly in large enterprises, there are often cases where the sender and the recipient live in different time zones. Ultimately, this difference in locales means that if the sender needs an immediate response from the recipient, there is a much smaller window to get a timely response based on the time zone differences. For instance, when receiving questions from coworkers, vendors or other contacts that work in a time zone that is several hours ahead, the recipient is generally forced to answer those emails and questions early in the day in order to obtain a response in the same day. As many email users receive hundreds of emails in their inbox per day, emails from colleagues in different time zones can quickly get lost in the pile and do not receive a timely response.

BRIEF DESCRIPTION OF THE DRAWINGS

The accompanying drawings, which are incorporated in and constitute part of this specification, illustrate embodiments of the present disclosure and together with the description, serve to explain the principles of the disclosure. The embodiments illustrated herein are for example purposes only and not limited to the precise arrangements and instrumentalities shown, wherein:

FIG. 4 is an example screen shot illustrating one method of displaying a messaging hub of a communication device which presents a message prioritized by time zone;

FIG. 5 is an example screen shot illustrating another method of displaying a messaging hub of a communication device which presents a message prioritized by time zone;

DETAILED DESCRIPTION

Figure 1:
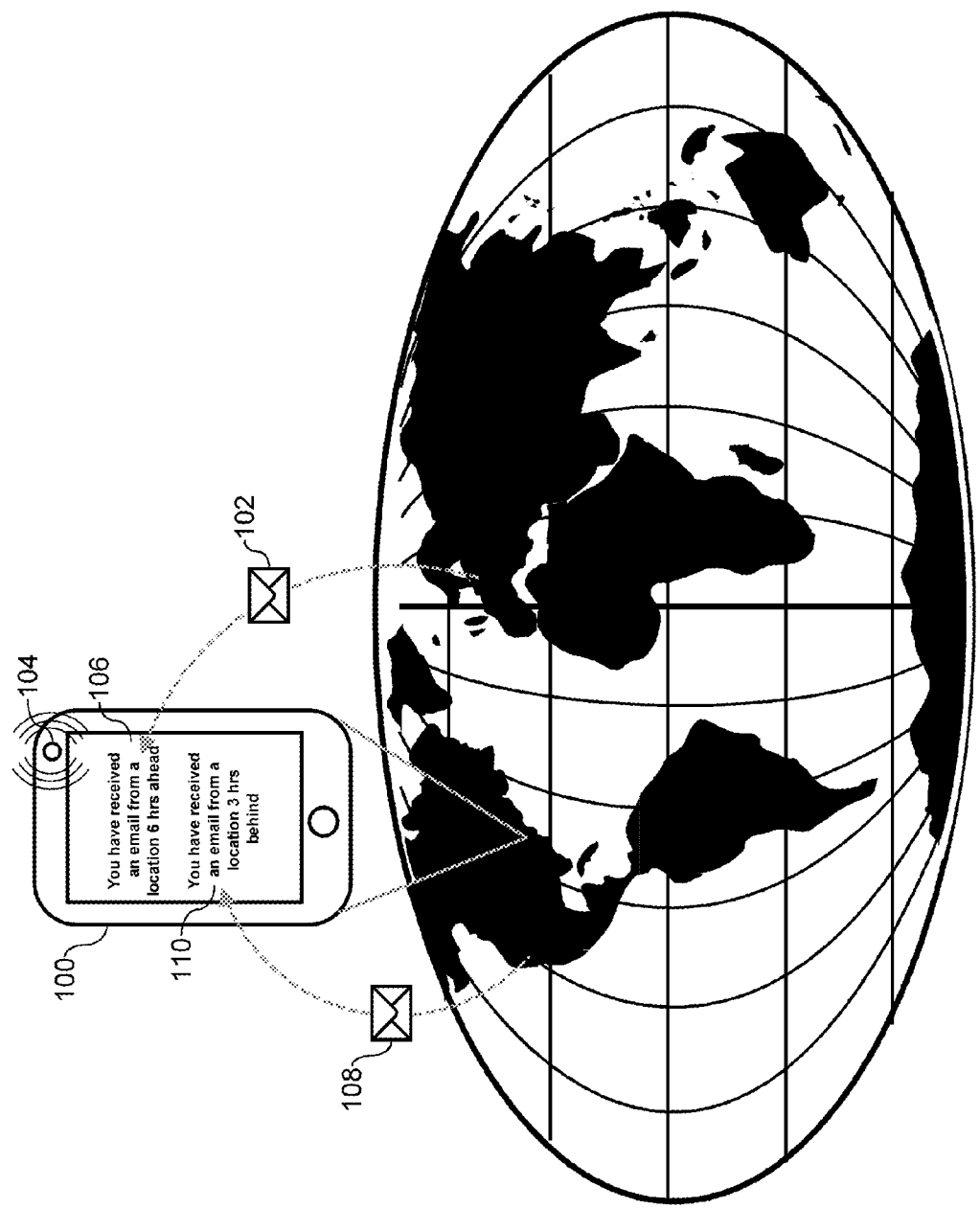
FIG. 1 is a pictorial illustration of a process for receiving and notifying a communication device user of an incoming message originating from a different time zone in accordance with one aspect of the present disclosure.

An aspect of the present disclosure provides for a communication device and method of displaying an email message on a communication device. At least one incoming email message is received and determined that the incoming email message originates from a different time zone than the time zone in which the communication device is currently located. The incoming email message is displayed in a prioritized position within a message listing. Displaying the incoming email message in a prioritized position within the message listing may comprise displaying the incoming email is displayed at a top of the message list, regardless of reception order.

In accordance with another aspect of the present disclosure, a plurality of incoming email messages, each email message originating from a different time zone than the time zone in which the communication device is currently located is received. Each incoming email message is displayed in the message listing according to absolute time distance from the communication device.

In accordance with yet another aspect of the present disclosure, a plurality of incoming email messages, each email message originating from a different time zone than the time zone in which the communication device is currently located is received and each incoming email message is displayed in the message listing according to a relative time distance from the communication device.

In accordance with yet another aspect of the present disclosure when the incoming email message has been determined to be read, the read email message is moved to a normal position within the message list.

In accordance with yet another aspect of the present disclosure, displaying the incoming email message a prioritized position within a message listing comprises displaying the incoming email message along with a priority indicator. The priority indicator may be at least one of sub-text, an icon, message text displayed in a different color, message text displayed in a different font, a message box having a different background color than a message box for a normal message, and an enhanced message box border.

In accordance with yet another aspect of the present disclosure, displaying the incoming email message in a prioritized position within a message listing comprises displaying the incoming email message in a prioritized position when a time difference between the originating time zone and the time zone in which the communication device is currently located is greater than a predetermined threshold.

In accordance with another aspect of the present disclosure, the method further comprises determining a difference between a current time in the originating time zone and a workday end time in the originating time zone and displaying an indication of the difference.

In accordance with another aspect of the present disclosure, a non-transitory computer-readable medium is provided which comprises computer instructions for displaying an email message which, when executed by a processor of the communication device cause the communication device to receive at least one incoming email message, determine the incoming email message originates from a different time zone than the time zone in which the communication device is currently located and display the incoming email message in a prioritized position within a message listing. The incoming email may be displayed at a top of the message list, regardless of reception order.

In accordance with yet another aspect of the present disclosure, the non-transitory computer-readable medium may also comprise computer instructions, which when executed by the processor, cause the communication device to receive a plurality of incoming email messages, each email message originating from a different time zone than the time zone in which the communication device is currently located and display each incoming email message in the message listing according to absolute time distance from the communication device.

In accordance with yet another aspect of the present disclosure, the non-transitory computer-readable medium may also comprise computer instructions, which when executed by the processor, cause the communication device to receive a plurality of incoming email messages, each email message originating from a different time zone than the time zone in which the communication device is currently located and display each incoming email message in the message listing according to a relative time distance from the communication device.

In accordance with still another aspect, the non-transitory computer-readable medium may further comprise computer instructions, which when executed by the processor, cause the communication device to determine the incoming email message has been read move the read email message to a normal position within the message list. Displaying the incoming email message a prioritized position within a message listing may comprise displaying the incoming email message along with a priority indicator. The priority indicator may be at least one of sub-text, an icon, message text displayed in a different color, message text displayed in a different font, a message box having a different background color than a message box for a normal message, and an enhanced message box border.

In accordance with yet another aspect of the present disclosure, the non-transitory computer-readable medium may also comprise computer instructions, which when executed by the processor, cause the communication device to determine a difference between a current time in the originating time zone and a workday end time in the originating time zone and display an indication of the difference. Displaying the incoming email message in a prioritized position within a message listing may comprise displaying the incoming email message in a prioritized position when a time difference between the originating time zone and the time zone in which the communication device is currently located is greater than a predetermined threshold.

In accordance with another aspect of the present disclosure, a communication device comprises a display, a communication interface that receives at least one incoming email message and a processor that determines the incoming email message originates from a different time zone than the time zone in which the communication device is currently located and displays the incoming email message on the display in a prioritized position within a message listing. When the at least one incoming mail message comprises a plurality of incoming email messages and each email message is originating from a different time zone than the time zone in which the communication device is currently located, the processor further displays each incoming email message in the message listing according to one of an absolute time distance and a relative time distance from the communication device.

Referring now to FIG. 1, one example of a communication device 100 for receiving and notifying a communication device user of an incoming message 102, 108 originating from a different time zone is shown. In this example, the user of the communication device 100 may be located, for example, in New York, which is in the Eastern Standard Time zone (EST). If the communication device 100 receives a message, such as an email message 102, originating from a user located in Germany, which is in the Central European Time zone (CET), the communication device 100 may notify the user that a new email has arrived by sounding an audio alert, a haptic alert or displaying a visual alert, such as flashing an LED 104 in a particular pattern or displaying a visual indication 106 on the display. This notification may take a different form than when receiving a regular email as the new email 102 is considered a priority email. For example, the user may elect to set a different audio or visual pattern specifically for emails originating from different time zones. The visual indication 106 may advise the user of the originating time zone by stating that the user has received an email from a specific time zone or by determining and displaying the time difference between the time zone where the communication device 100 is located and the time zone in which the message originated (e.g., "You have received an email from a location 6 hours ahead").

If the communication device 100 receives additional email messages originating from other time zones, such as email message 108 originating from California, which is located in the Pacific Standard Time zone (PST), the communication device 100 may notify the user of the arrival of the new email message 108 in the same manner as above, (e.g., a visual indication 110 stating, "You have received an email message from a location 3 hours behind"). Of course, the user may elect to assign different audio, haptic and visual alerts for each time zone. Additionally, if multiple visual indications 106, 110 are displayed simultaneously, the communication device 100 may list the indication for the email message originating from the farthest distance away first, followed by messages received from closer time zones, in the order of distance.

Figure 2:
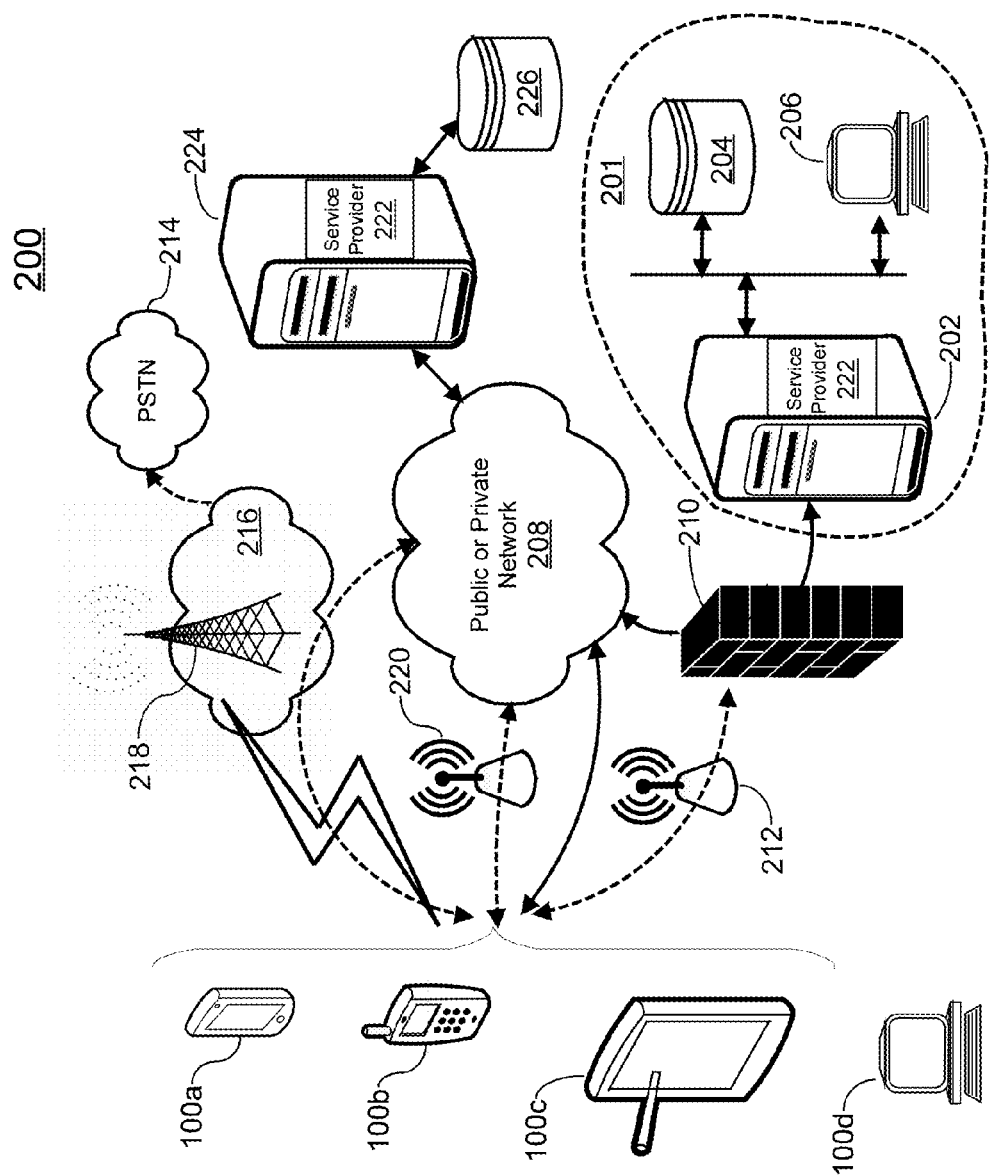
FIG. 2 is a schematic diagram of an example network for use in receiving and presenting an incoming message originating from a different time zone according to one aspect of the present disclosure.

FIG. 2 illustrates an example of a possible network topology 200 that may be used with the example communication device 100. It will be understood by those skilled in the art that the schematic of FIG. 2 is merely representative of only particular aspects of a network, and omits other components that are typically included for ease of exposition, such as peripheral devices, routers, mobile data servers, and the like; and further, that the network illustrated herein may include different components and/or be arranged in different topologies than that shown in FIG. 2. Communication device 100 may be a wired or wireless device such as a smart phone 100a, a traditional cellular phone 100b, a tablet device 100c, a laptop or desktop computer 100d or any device capable of transmitting and receiving email messages.

A host system 201 may be provided, which can be an own-premises local area network (LAN), or wide area network in communication with LANs, with local computing resources such as one or more servers 202, one or more data repositories 204 and client devices 206 such as terminals or workstations. The servers 202 and data repositories 204 represent controllers, security and information technology policy modules, application servers, messaging servers, file servers, databases, memory devices and the like for providing services to users over the LAN and also over the public or private network 208 to users at their respective electronic devices, and to transmit data to destinations and receive data from outside the host system 201 over the network 208. The host system 201 and its elements will include, as will be appreciated by those skilled in the art, those components generally included in such devices, such as communication subsystems for communicating over one or more fixed or wireless networks, one or more processors, data stores, disk arrays, and the like. The services can include but are not limited to messaging, directory services, collaborative applications, calendaring applications, search engines, file servers, identity, encryption, compression, security, mobile device management, external system integration and secure access to intranet resources (e.g., virtual private networks (VPNs)), and it will be appreciated by those skilled in the art that the various network components 202, 204, 208 will be adapted for use with those services.

Messaging services can be implemented using one or more servers 202 provided with means for storing messages (e.g., a database or a suitable data repository 204) for each message service or format available using the host system 201, such as email, instant messaging, voicemail, and the like. The host system 201 may be maintained by and confined to a single enterprise, an individual or a group of enterprises/individuals. The server 202 (or a plurality of such servers) and its corresponding data repository 204 can therefore store all received and sent messages on behalf of each user, whether those messages originated inside or outside the host system 201. In some embodiments, messages sent and received by a user may be stored only locally on the user's client device and not maintained in a persistent store in the host system 201, while in other embodiments the messages are stored both locally at the client device as well as the server, in which case the message data stores on the client device and the server are synchronized or reconciled periodically. The user device may be any suitable computing or communication device adapted for composition and transmission of messages such as the client devices 206 or wireless devices 100*a*, 100*b*, 100*c*, 100*d* illustrated in FIG. 2. In fact, a single user may use multiple devices 206, 100*a*, 100*b*, 100*c*, 100*d* to access the host system 201 services. For ease of reference, a single device 100 is referred to although it will be appreciated by the reader that these embodiments may be implemented using each of these multiple devices.

The host system 201 may operate from behind a firewall or proxy server 210, which provides a secure node and optionally a wireless internet gateway for the host system 201. Client devices such as the communication device 100 can then access the host system 201 wirelessly through the firewall or proxy server 210, as denoted by the access point 212. External access to the host system 201 by devices 100 may also be provided via a public or private network 208. The communication device 100 may be configured to access the public switched telephone network 214 through a wireless network 216, which may comprise one or more nodes 218 configured for communication in accordance a suitable mobile telephony standard. In turn, the wireless network 216 provides the electronic device 100 with connectivity to the Internet or other public wide area network 208, and thence to the organization's host system 201. Alternatively or additionally, if the communication device 100 is provisioned to communicate over wireless networks that are typically IP-based, such as wireless LANs implementing the Wi-Fi protocol (one or more of the IEEE 802.11 suite of protocols), personal area networks implementing other protocols such as Bluetooth, other wireless networks implementing wireless broadband standards such as WiMAX (one or more of the IEEE 802.16 suite of protocols), and the like, the communication device 100 accesses the public or private wide area network 208 through a third-party access point, such as the user's own personal access point and Internet connection, or a third party hotspot device, as denoted by the access point 220.

The services above, such as email messaging, can be provided in a self-hosted system as suggested above, i.e., a host system 201 supplied by and managed by the organization itself. The host system 201 may include a service provider 222, such as a mobile device management system, functioning to provide services for a wireless device. The person skilled in the art will appreciate that one or more services provided to organization users may instead by provided by third parties in software as a service, platform as a service, or infrastructure as a service arrangement, colloquially referred to as cloud computing services. For example, messaging services can be hosted by a third party service maintaining an external enterprise server 224 and data repository 226, and the service provider 222 may be included as part of the enterprise server 224 or at some other location within the network 200. Access to the external enterprise server 224 can be made available both externally to external client devices such as the communication device 100, and to client devices 206 within the host system's 201 LAN over the public or private network 208. Regardless, the host system's 201 own network services are made available only to those users who possess sufficient credentials to access the services, whether they are accessed internally or externally, and whether provided by the self-hosted or the virtually (externally) hosted system. Messaging services in particular are accessible by the users through client messaging applications executing on the users' communication devices 100 which communicate with a message server such as the server 202 or 224.

The communication device 100*a*, 100*b*, 100*c*, 100*d*, other client device 206, and/or the server 202, 224 (or another computing device in the host system 201) may be configured to implement the methods described herein.

Figure 3:
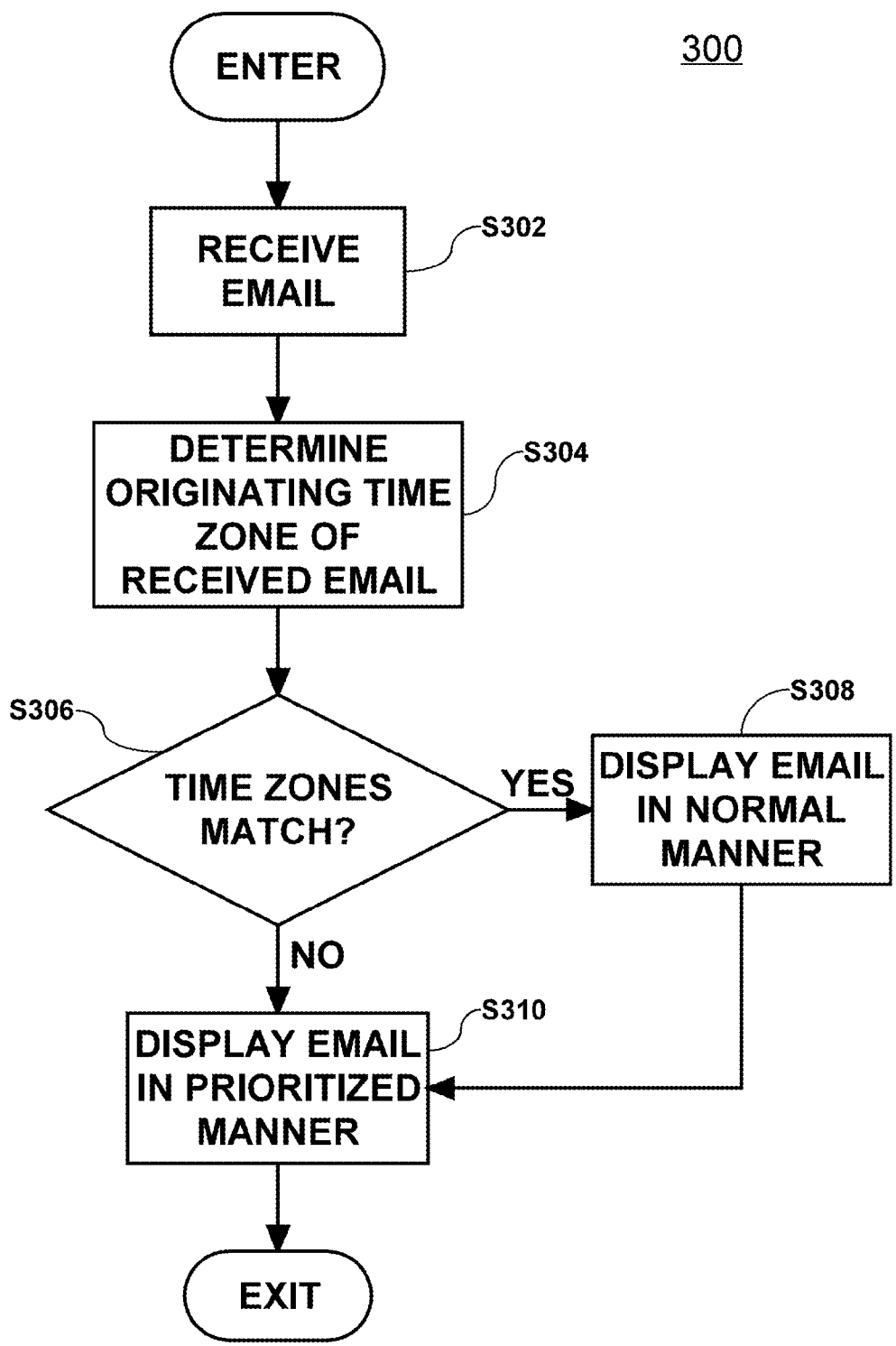
FIG. 3 is a flow chart illustrating a process for receiving and presenting an incoming message originating from a different time zone in accordance with one aspect of the present disclosure.

Referring now to FIG. 3, a flow chart 300 illustrating an example method for receiving and displaying email messages originating from a different time zone is shown. The process begins at step S302 when the communication device 100 receives an incoming email. The communication device 100 determines, at step S304, the originating time zone where the sending communication device is located. The originating time zone may be automatically included in the email message by the originating email system. However, in the absence of such a feature, the time zone information may be manually included in the email message by the user of the sending device or maintained at the receiving communication device 100 in a listing that associates contacts in the user's contact list with a corresponding time zone.

The receiving communication device 100 knows the time zone in which the communication device 100 currently resides from its device settings. At step S306, the communication device 100 compares its own time zone information with the time zone information of the incoming email. If the time zones match, the communication device 100 displays, at step S308, the incoming email in a manner consistent with the normal operation of the email application. However, if the time zones do not match, at step S306, the communication device 100 alerts the user as described above and displays, at step S310, the incoming message in a prioritized manner as discussed below.

FIG. 4 illustrates a screen shot of one example manner of presenting an email message 402 received from a different time zone in a message listing 404, according to one aspect of the present disclosure. Email message 402 is displayed in a prioritized position at the top of the message list 404 regardless of the reception order in which it was received (i.e. other email messages may have been received prior or subsequent to receiving email message 402). A priority indicator, such as sub-text 406 (i.e. "Sender is in a different timezone 6 hours ahead of you") or an icon 408 indicate that there is a time zone mismatch between sender and receiver. After the incoming email message 402 has been read, the message 402 may be presented in its normal position within the message list 404 according to current sorting preferences (e.g., by sender, reception time, subject, etc.).

Additionally, the communication device 100 may determine the difference between the current time in the originating time zone and the end of the work day at the originating time zone and notify the communication device user of such difference (e.g., "The workday for the sender of this message ends in 20 minutes!").

An enhanced message box border, such as colored bar 410, may also be placed on the left side of the message list item 412 to denote priority. Although not shown, the enhanced message box border may also be placed on the right side of the message list item 412, above, below or surrounding message list item 412. The enhanced message box border may have a different thickness or style than a border of a normal message box or may be rendered in a different color.

Additional new or unread messages from different time zones (not shown) may be displayed in a prioritized position in the message list 404 according to the order of the absolute time distance from the receiving communication device 100. For example, a message originating from a time zone 8 hours behind may be displayed before email message 402 which is only 6 hours ahead. Alternately, email messages from different time zones may be displayed in the message list 404 in order of the relative time distance from the receiving communication device 100. For example, the user may determine that messages coming from a time zone that is ahead of the current time zone are more important than messages originating in a time zone that is behind the current time zone as the work day in the time zone that is ahead ends sooner than the work day in the lagging time zone. In that case, the user can set the options in the email application that prioritizes according to the relative time distance. In that case, a message originating from a time zone 8 hours behind may be displayed after email message 402 which is 6 hours ahead. Other options may allow the user to determine a threshold distance from the communication device 100 the sender is located before incoming emails become prioritized. For example, the user may determine that time zones less than two hours away are not to be displayed as prioritized.

FIG. 5 illustrates a screen shot of another example manner of presenting an email message 502 received from a different time zone in a message listing 504 according to another aspect of the present disclosure. As with the illustration of FIG. 4, sub-text 506 and an icon 508 indicate that there is a time zone mismatch between sender and receiver. Additionally, the message list item box 510 for email message 502 is colored differently to stand out and catch the attention of the communication device 100 user. Alternately or additionally, a textual preview 512 of email message 502 may be colored differently (not shown) than other messages.

Figure 6:
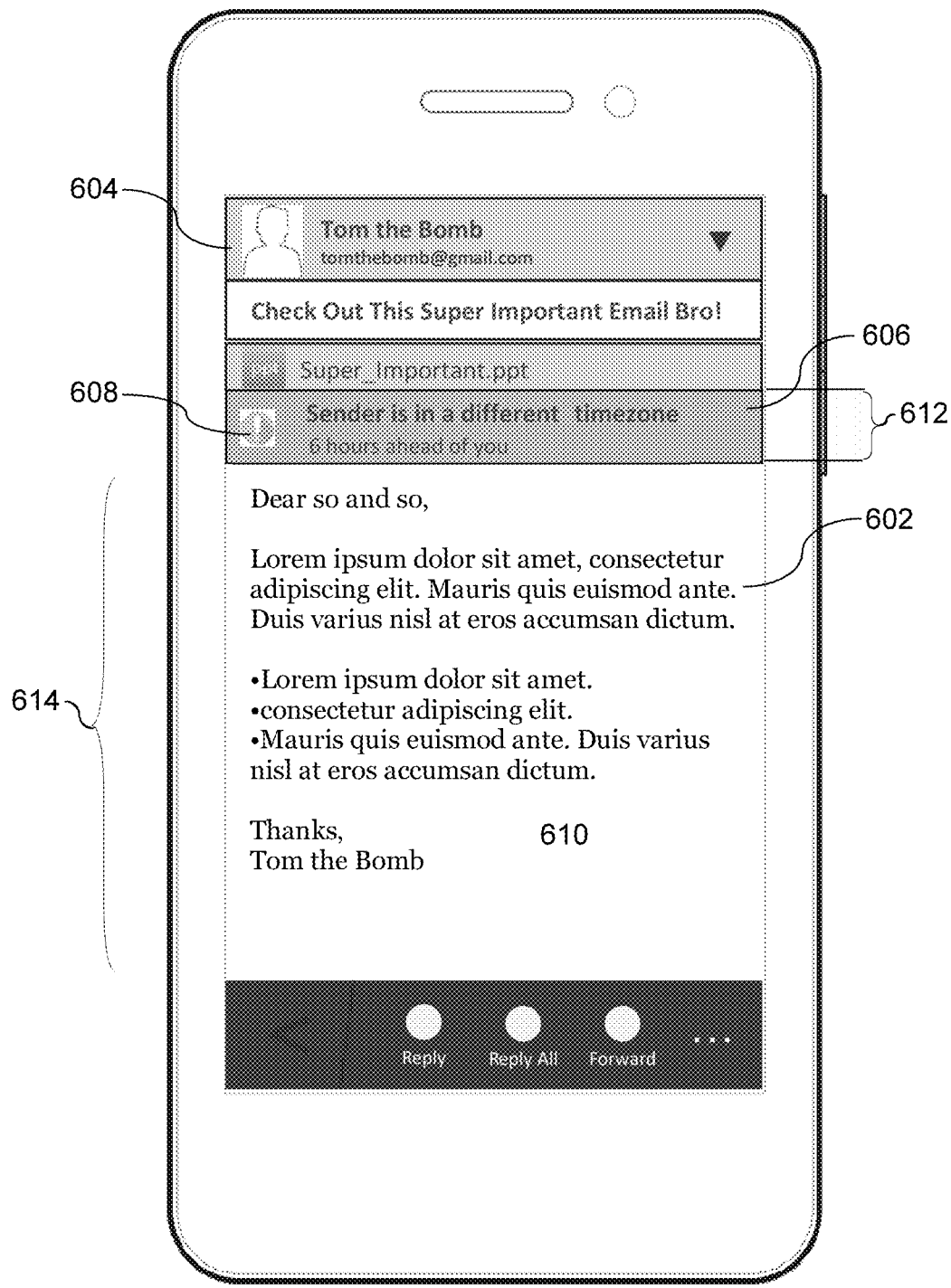
FIG. 6 is an example screen shot illustrating one method of displaying a message prioritized by time zone.

FIG. 6 illustrates a screen shot of one example manner of displaying an email message 602 received from a different time zone according to one aspect of the present disclosure. An email viewer 604 is opened, and a visual indication 606 of the time zone mismatch is displayed with an icon 608 above the body 610 of the email. As with the message list 404, the email viewer 604 may display the visual indication 606 as a message box 612 having different color than the viewing area 614 of the body 610 of the email message 602. Additionally, text of the visual indication 606 may have a different color or font than the text of the body 610. The visual indication 606 may be displayed in any manner that enables the user to distinguish the email message 602 as having originated from a different time zone.

Figure 7:
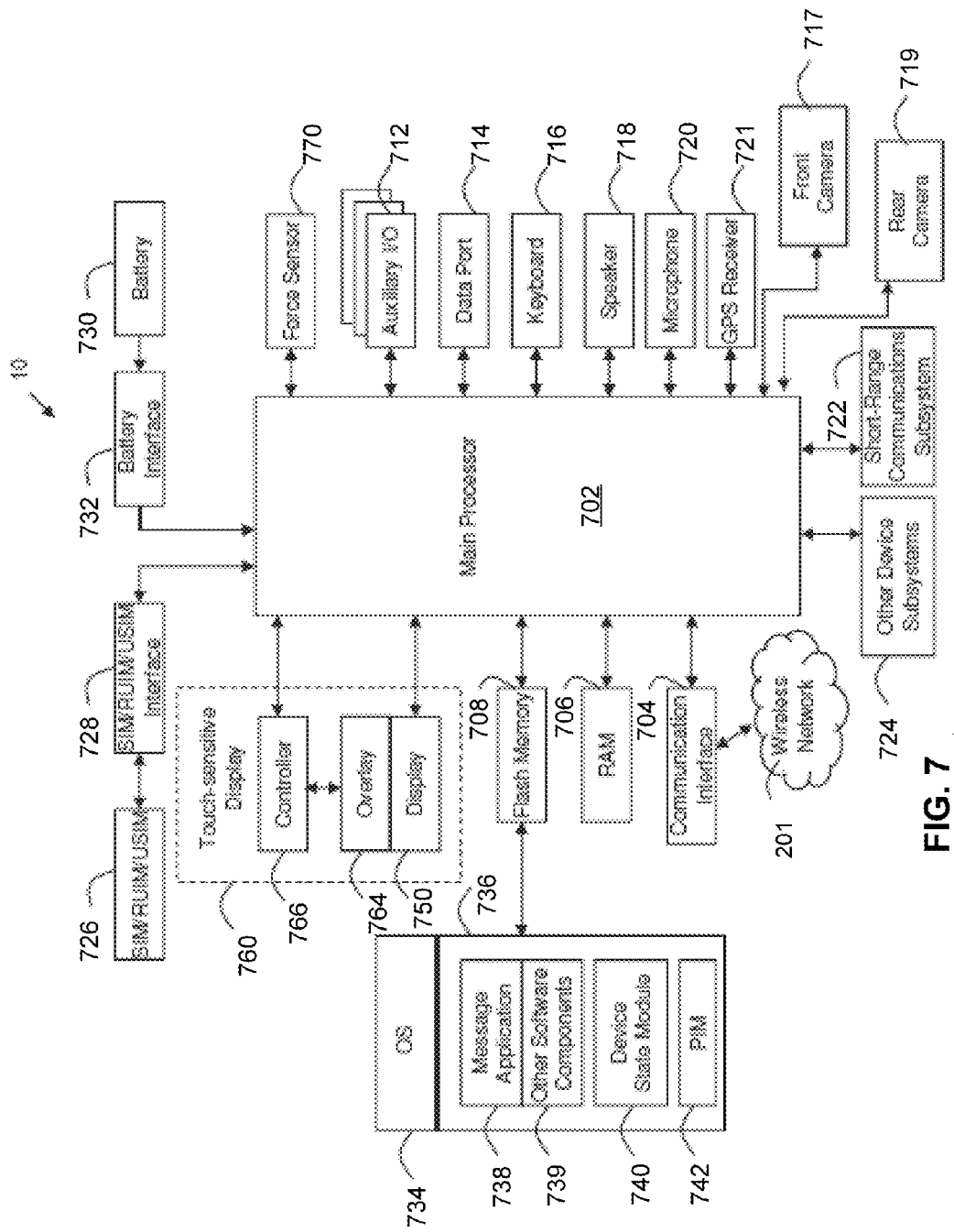
FIG. 7 is a block diagram of an example of a configuration for a mobile electronic communication device in accordance with one aspect of the present disclosure.

Referring to FIG. 7, to further aid in the understanding of the example communication devices 100 described above, shown therein is a block diagram of an example configuration of a communication device configured as a "mobile device", referred to generally as "mobile device 10." The mobile device 10 includes a number of components such as a main processor 702 that controls the overall operation of the mobile device 10. Communication functions, including data and voice communications, are performed through at least one communication interface 704. The communication interface 704 receives messages from and sends messages to a wireless network 201. In this example of the mobile device 10, the communication interface 704 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 704 with the wireless network 201 represents one or more different Radio Frequency (RF) channels, operating according to defined protocols specified for GSM/GPRS communications.

The main processor 702 also interacts with additional subsystems such as a Random Access Memory (RAM) 706, a flash memory 708, a touch-sensitive display 760, an auxiliary input/output (I/O) subsystem 712, a data port 714, a keyboard 716 (physical, virtual, or both), a speaker 718, a microphone 720, a GPS receiver 721, a front camera 717, a rear camera 719, short-range communications subsystem 722, and other device subsystems 724. Some of the subsystems of the mobile device 10 perform communication-related functions, whereas other subsystems may provide "resident" or on-device functions. By way of example, the touch-sensitive display 760 and the keyboard 716 may be used for both communication-related functions, such as entering a text message for transmission over the wireless network 201, and device-resident functions such as a calculator or task list. In one example, the mobile device 10 can include a non-touch-sensitive display in place of, or in addition to the touch-sensitive display 760. For example the touch-sensitive display 760 can be replaced by a display 750 that may not have touch-sensitive capabilities.

The mobile device 10 can send and receive communication signals over the wireless network 201 after required network registration or activation procedures have been completed. Network access is associated with a subscriber or user of the mobile device 10. To identify a subscriber, the mobile device 10 may use a subscriber module component or "smart card" 726, such as a Subscriber Identity Module (SIM), a Removable User Identity Module (RUIM) and a Universal Subscriber Identity Module (USIM). In the example shown, a SIM/RUIM/USIM 726 is to be inserted into a SIM/RUIM/USIM interface 728 in order to communicate with a network.

The mobile device 10 is typically a battery-powered device and includes a battery interface 732 for receiving one or more rechargeable batteries 730. In at least some examples, the battery 730 can be a smart battery with an embedded microprocessor. The battery interface 732 is coupled to a regulator (not shown), which assists the battery 730 in providing power to the mobile device 10. Although current technology makes use of a battery, future technologies such as micro fuel cells may provide the power to the mobile device 10.

The mobile device 10 also includes an operating system 734 and software components 736 to 742. The operating system 734 and the software components 736 to 742, that are executed by the main processor 702 are typically stored in a non-transitory persistent store such as the flash memory 708, which may alternatively be a read-only memory (ROM) or similar storage element (not shown). Those skilled in the art will appreciate that portions of the operating system 734 and the software components 736 to 742, such as specific device applications, or parts thereof, may be temporarily loaded into a volatile store such as the RAM 706. Other software components can also be included, as is well known to those skilled in the art.

The subset of software applications 736 that control basic device operations, including data and voice communication applications, may be installed on the mobile device 10 during its manufacture. Software applications may include a message application 738, a device state module 740, and a Personal Information Manager (PIM) 742. A message application 738 can be any suitable software program that allows a user of the mobile device 10 to send and receive electronic messages, such as the email messaging application described herein, wherein messages are typically stored in the flash memory 708 of the mobile device 10. A device state module 740 provides persistence, i.e. the device state module 740 ensures that important device data is stored in persistent memory, such as the flash memory 708, so that the data is not lost when the mobile device 10 is turned off or loses power. A PIM 742 includes functionality for organizing and managing data items of interest to the user, such as, but not limited to, email, contacts, calendar events, and voice mails, and may interact with the wireless network 201.

Other types of software applications or components 739 can also be installed on the mobile device 10. These software applications 739 can be pre-installed applications (i.e. other than message application 738) or third party applications, which are added after the manufacture of the mobile device 10. Examples of third party applications include games, calculators, utilities, etc.

The additional applications 739 can be loaded onto the mobile device 10 through at least one of the wireless network 201, the auxiliary I/O subsystem 712, the data port 714, the short-range communications subsystem 722, or any other suitable device subsystem 724.

The data port 714 can be any suitable port that enables data communication between the mobile device 10 and another computing device. The data port 714 can be a serial or a parallel port. In some instances, the data port 714 can be a Universal Serial Bus (USB) port that includes data lines for data transfer and a supply line that can provide a charging current to charge the battery 730 of the mobile device 10.

For voice communications, received signals are output to the speaker 718, and signals for transmission are generated by the microphone 720. Although voice or audio signal output is accomplished primarily through the speaker 718, the display 750 can also be used to provide additional information such as the identity of a calling party, duration of a voice call, or other voice call related information.

The touch-sensitive display 760 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 760 is a capacitive touch-sensitive display which includes a capacitive touch-sensitive overlay 764. The overlay 764 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 750 of the touch-sensitive display 760 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 760. The processor 702 may determine attributes of the touch, including a location of a touch. Touch location data may include an area of contact or a single point of contact, such as a point at or near a center of the area of contact, known as the centroid. A signal is provided to the controller 766 in response to detection of a touch. A touch may be detected from any suitable object, such as a finger, thumb, appendage, or other items, for example, a stylus, pen, or other pointer depending on the nature of the touch-sensitive display 760. The location of the touch moves as the detected object moves during a touch. One or both of the controller 766 and the processor 702 may detect a touch by any suitable contact member on the touch-sensitive display 760. Similarly, multiple simultaneous touches, are detected.

In some examples, an optional force sensor 770 or force sensors is disposed in any suitable location, for example, between the touch-sensitive display 760 and a back of the mobile device 10 to detect a force imparted by a touch on the touch-sensitive display 760. The force sensor 770 may be a force-sensitive resistor, strain gauge, piezoelectric or piezoresistive device, pressure sensor, or other suitable device.

Aspects of the present disclosure may be embodied as a device or apparatus, system, method or computer program product. Accordingly, aspects of the present disclosure may take the form of an entirely hardware-based embodiment, an entirely software-based embodiment (including firmware, resident software, micro-code, etc.) or an embodiment combining software and hardware that may all generally be referred to herein as a "circuit," "module" or "system." Furthermore, aspects of the present disclosure may take the form of a computer program product embodied in one or more computer readable medium(s) having computer readable program code embodied thereon. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) may include the following tangible media: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Non-tangible or non-transitory media may include a propagated data signal with computer readable program code embodied therein, for example, in baseband or as part of a carrier wave. Such a propagated signal may take any of a variety of forms, including, but not limited to, electromagnetic, optical, or any suitable combination thereof. Computer program code or instructions for carrying out operations for aspects of the present disclosure may be any combination of one or more programming languages, including an object oriented programming language and conventional procedural programming languages. The program code may execute on one or more devices such as a computer and/or server.

Aspects of the present disclosure have been described above with reference to flowchart illustrations and/or block diagrams of methods, apparatus (systems) and computer program products according to embodiments of the disclosure. In this regard, the flowchart and block diagrams in the figures illustrate the architecture, functionality, and operation of possible implementations of systems, methods and computer program products according to various embodiments. However it should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented wholly or partially by special purpose hardware-based systems that perform the specified functions or acts, or combinations of special purpose hardware and computer instructions. Furthermore it also will be understood that each block of the flowchart illustrations and/or block diagrams, and combinations of blocks in the flowchart illustrations and/or block diagrams, can be implemented wholly or partially by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Finally, the terminology used herein is for the purpose of describing particular embodiments only and is not intended to be limiting. That is, the description of the present disclosure has been presented for purposes of illustration and description, but is not intended to be exhaustive or limited to the form disclosed. Many modifications and variations will be apparent without departing from the scope of the disclosure defined in the appended claims.

I claim:

1. A method of displaying an email message on a communication device comprising:
   receiving, by the communication device, at least one incoming email message;
   determining, by the communication device, the incoming email message originates from a different time zone than the time zone in which the communication device is currently located; and
   the communication device displaying the incoming email message in a prioritized position within a message listing on a display of the communication device only when a time difference between the originating time zone and the time zone in which the communication device is currently located is greater than a predetermined threshold.

2. The method of claim 1, wherein displaying the incoming email message in a prioritized position within the message listing comprises displaying the incoming email at a top of the message list, regardless of reception order.

3. The method of claim 1, further comprising:
   receiving a plurality of incoming email messages, each email message originating from a different time zone than the time zone in which the communication device is currently located; and
   displaying each incoming email message in the message listing according to absolute time distance from the communication device.

4. The method of claim 1, further comprising:
   receiving a plurality of incoming email messages, each email message originating from a different time zone than the time zone in which the communication device is currently located; and
   displaying each incoming email message in the message listing according to a relative time distance from the communication device.

5. The method of claim 1, further comprising:
   determining the incoming email message has been read; and
   moving the read email message to a normal position within the message list.

6. The method of claim 1, wherein displaying the incoming email message a prioritized position within a message listing comprises displaying the incoming email message along with a priority indicator.

7. The method of claim 6, wherein the priority indicator is at least one of sub-text, an icon, message text displayed in a different color, message text displayed in a different font, a message box having a different background color than a message box for a normal message, and an enhanced message box border.

8. The method of claim 1, further comprising:
   determining a difference between a current time in the originating time zone and a workday end time in the originating time zone; and
   displaying an indication of the difference.

9. A non-transitory computer-readable medium comprising computer instructions for displaying an email message which, when executed by a processor of the communication device cause the communication device to:
   receive, by the communication device, at least one incoming email message;
   determine, by the communication device, the incoming email message originates from a different time zone than the time zone in which the communication device is currently located; and
   display the incoming email message in a prioritized position within a message listing on a display of the communication device only when a time difference between the originating time zone and the time zone in which the communication device is currently located is greater than a predetermined threshold.

10. The non-transitory computer-readable medium of claim 9, wherein displaying the incoming email message in a prioritized position within the message listing comprises displaying the incoming email at a top of the message list, regardless of reception order.

11. The non-transitory computer-readable medium of claim 9, further comprising computer instructions, which when executed by the processor, cause the communication device to:
 receive a plurality of incoming email messages, each email message originating from a different time zone than the time zone in which the communication device is currently located; and
 display each incoming email message in the message listing according to absolute time distance from the communication device.

12. The non-transitory computer-readable medium of claim 9, further comprising computer instructions, which when executed by the processor, cause the communication device to:
 receive a plurality of incoming email messages, each email message originating from a different time zone than the time zone in which the communication device is currently located; and
 display each incoming email message in the message listing according to a relative time distance from the communication device.

13. The non-transitory computer-readable medium of claim 9, further comprising computer instructions, which when executed by the processor, cause the communication device to:
 determine the incoming email message has been read; and
 move the read email message to a normal position within the message list.

14. The non-transitory computer-readable medium of claim 9, wherein displaying the incoming email message a prioritized position within a message listing comprises displaying the incoming email message along with a priority indicator.

15. The non-transitory computer-readable medium of claim 14, wherein the priority indicator is at least one of sub-text, an icon, message text displayed in a different color, message text displayed in a different font, a message box having a different background color than a message box for a normal message, and an enhanced message box border.

16. The non-transitory computer-readable medium of claim 9, further comprising computer instructions, which when executed by the processor, cause the communication device to:
 determine a difference between a current time in the originating time zone and a workday end time in the originating time zone; and
 display an indication of the difference.

17. A communication device comprising:
 a display;
 a communication interface that receives at least one incoming email message; and
 a microprocessor that:
  determines the incoming email message originates from a different time zone than the time zone in which the communication device is currently located; and
  displays the incoming email message on the display in a prioritized position within a message listing only when a time difference between the originating time zone and the time zone in which the communication device is currently located is greater than a predetermined threshold.

18. The communication device of claim 17, wherein the at least one incoming mail message comprises a plurality of incoming email messages, each email message originating from a different time zone than the time zone in which the communication device is currently located, the processor further displays each incoming email message in the message listing according to one of an absolute time distance and a relative time distance from the communication device.

* * * * *